US009802518B2

(12) United States Patent
Steinberger et al.

(10) Patent No.: US 9,802,518 B2
(45) Date of Patent: Oct. 31, 2017

(54) PNEUMATIC ADJUSTMENT ARRANGEMENT FOR A VEHICLE SEAT

(71) Applicant: Conti Temic Microelectronic GmbH, Nürnberg (DE)

(72) Inventors: Johann Steinberger, Brunnen (DE); Stefan Weickmann, Weiboldshausen/Höttingen (DE); Marco Zehndbauer, Stammham (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 216 days.

(21) Appl. No.: 14/381,328

(22) PCT Filed: Mar. 5, 2013

(86) PCT No.: PCT/EP2013/054400
§ 371 (c)(1),
(2) Date: Aug. 27, 2014

(87) PCT Pub. No.: WO2013/131913
PCT Pub. Date: Sep. 12, 2013

(65) Prior Publication Data
US 2015/0061337 A1    Mar. 5, 2015

(30) Foreign Application Priority Data

Mar. 6, 2012   (DE) .................. 10 2012 203 480

(51) Int. Cl.
*A47C 4/54*   (2006.01)
*B60N 2/44*   (2006.01)
(Continued)

(52) U.S. Cl.
CPC ......... *B60N 2/4415* (2013.01); *B60N 2/0224* (2013.01); *B60N 2/525* (2013.01);
(Continued)

(58) Field of Classification Search
CPC .......... B60N 2/522; B60N 2/52; B60N 2/525; B60N 2/4415
(Continued)

(56) References Cited

U.S. PATENT DOCUMENTS 3,578,166 A * 5/1971 Paulus ...................... C02F 3/28
                                                     210/110
4,316,523 A    2/1982 Boretti
(Continued)

FOREIGN PATENT DOCUMENTS

DE         4116483       11/1992
DE    10 2004 005 843    9/2005
(Continued)

OTHER PUBLICATIONS

International Search Report for PCT/EP2013/054400 dated Jun. 7, 2013.
(Continued)

*Primary Examiner* — Chi Q Nguyen
(74) *Attorney, Agent, or Firm* — RatnerPrestia

(57) ABSTRACT

A pneumatic adjustment arrangement for a vehicle seat. The pneumatic adjustment arrangement has at least one chamber or bladder, which can be filled with a pressure medium, as an adjustment element. Furthermore, the pneumatic adjustment arrangement has a fluid line for the filling and/or evacuation of the chamber. Additionally, the pneumatic adjustment arrangement has a valve device which is provided in the fluid line for volume flow regulation. Finally, the pneumatic adjustment arrangement has a noise absorber which is likewise arranged in the fluid line in order to absorb noise generated in the fluid line. In this way, it is possible to create a pneumatic adjustment arrangement for a vehicle
(Continued)

seat, in particular for comfort functions, such that objectionable noises during the execution of the comfort fiction are reduced.

15 Claims, 2 Drawing Sheets

(51) Int. Cl.
  *B60N 2/52* (2006.01)
  *B60N 2/02* (2006.01)
  *B60N 2/64* (2006.01)
(52) U.S. Cl.
  CPC .................. *B60N 2/64* (2013.01); *B60N 2/52* (2013.01); *B60N 2/522* (2013.01); *Y10T 137/6855* (2015.04)
(58) Field of Classification Search
  USPC ........................................... 297/284.6, 284.1
  See application file for complete search history.

(56) References Cited

U.S. PATENT DOCUMENTS

| | | | |
|---|---|---|---|
| 4,840,425 A | 6/1989 | Noble | |
| 4,938,528 A * | 7/1990 | Scott | 297/284.6 |
| 5,564,627 A * | 10/1996 | Veitenhansl | B60H 1/00314 237/12.3 B |
| 5,637,076 A * | 6/1997 | Hazard et al. | 601/5 |
| 6,126,244 A * | 10/2000 | Fries | 303/3 |
| 6,206,351 B1 | 3/2001 | Hamada | |
| 6,592,533 B1 * | 7/2003 | Yonekawa et al. | 601/148 |
| 2001/0027719 A1 * | 10/2001 | Wahlberg | 92/134 |
| 2004/0183363 A1 * | 9/2004 | Roether et al. | 303/7 |
| 2008/0289900 A1 * | 11/2008 | Christoffers et al. | 181/258 |

FOREIGN PATENT DOCUMENTS

| | | | | |
|---|---|---|---|---|
| GB | 471431 | | 9/1937 | |
| JP | 55-146215 | | 11/1980 | |
| JP | H1163094 | | 3/1999 | |
| WO | WO 00/45673 | * | 2/1999 | ........... B60N 2/4415 |
| WO | WO 00/45673 | | 8/2000 | |

OTHER PUBLICATIONS

Written Opinion of the International Search Authority for International Application No. PCT/EP2013/054400, including an English translation.
German Search Report corresponding to application DE 10 2012 203 480.3, dated Dec. 5, 2012.

* cited by examiner

PNEUMATIC ADJUSTMENT ARRANGEMENT FOR A VEHICLE SEAT

CROSS REFERENCE TO RELATED APPLICATIONS

This application is the U.S. National Phase Application of PCT/EP2013/054400, filed Mar. 5, 2013, which claims priority to German Patent Application No. 10 2012 203 480.3, filed Mar. 6, 2012, the contents of such applications being incorporated by reference herein.

FIELD OF THE INVENTION

The present invention relates to a pneumatic adjustment arrangement for a vehicle seat having a sound absorber, and to a vehicle seat having a corresponding pneumatic adjustment arrangement for low-noise operation.

BACKGROUND OF THE INVENTION

In modern vehicle seats, bubbles or chambers which can be filled with compressed air are located in a region of the seat surface or seat backrest and can be supplied with compressed air via a respective compressed air line. By filling a respective bubble with compressed air, the volume thereof is increased so that as a result the properties of a seat backrest or seat surface in the contour can be changed. In order to fill the bubbles with compressed air, said compressed air is initially generated by a pressure source, for example by a compressor, and fed via a corresponding valve, in particular an electropneumatic valve, to a respective bubble. In this context, on the one hand, flow noise can occur during the filling of the bubble, and vibration noise can occur in the valve, in particular if the valve is embodied in the form of a piezo-valve in which a piezo wafer, provided as an actuator, is provided.

The process of filling the bubbles (as adjustment elements for a vehicle seat) therefore results in sound which is propagated into the bubbles via corresponding compressed air lines. However, this sound is disruptive during operation of a vehicle and adversely affects the driver.

SUMMARY OF THE INVENTION

An aspect of the present invention provides a possible way of enabling a pneumatic adjustment of a vehicle component, such as a vehicle seat, to take place with minimized noise.

In this context, a pneumatic adjustment arrangement for a vehicle seat comprises the following features. It has at least one chamber, which can be filled with a pressure medium, in particular air, as an adjustment element. This chamber or bubble has a variable volume and is, in particular, of elastic design. Furthermore, the adjustment arrangement comprises a fluid line or air line for filling and/or emptying the chamber. In addition, a valve device is provided which is provided in the fluid line for volume flow regulation, in particular, of the pressure medium or air into the chamber, but also possibly out of the chamber. Finally, a sound absorber is provided which is also arranged in the fluid line in order to absorb sound occurring in the fluid line. In this way, sound occurring in the pneumatic adjustment arrangement, whether owing to flow noise or owing to valve components etc., can be effectively absorbed and minimized for a vehicle seat user or a driver.

A particularly effective form of sound absorption in the pneumatic adjustment arrangement can be achieved in that the sound absorber (or a plurality of sound absorbers) is arranged in the air line, between the valve device and at least one respective chamber which can be filled with air. In this way, sound which occurs or noises which occur can be damped directly after they occur.

According to one advantageous refinement, the sound absorber comprises the following features. It has a housing with a fluid inlet or air inlet for letting in pressure medium or air into an interior space of the housing, and has a fluid outlet or air outlet for discharging pressure medium or air from the interior space. In addition, said sound absorber comprises a sound-absorbing or sound-damping material which is arranged in the interior space. These two essential components of the sound absorber, on the one hand the housing and, on the other hand, the sound-absorbing material, permit effective sound absorption to be ensured. The sound-absorbing material can be manufactured, for example, from a foamed material. The acoustic effect of the foamed material in terms of reducing noise is based here on converting energy of the sound waves as a result of the air friction in the structure of the foamed material.

According to a further advantageous refinement, the sound absorber can have a free flow cross section for the pressure medium flowing through it in the interior space of the housing, from the fluid inlet in the direction of the fluid outlet. In this way, a free flow cross section for the pressure medium flowing through the sound absorber is ensured, with the result that sound damping does not have an influence, or has the smallest possible influence, on the mass flow of the pressure medium flowing through.

In order to ensure this free flow cross section, it is conceivable that the absorption material is arranged as a shell-like insert in the sound absorber housing, wherein the sound-absorbing material then bears against an inner wall of the housing (like an inner shell) and can also be attached thereto.

According to a further refinement of the invention, the sound absorber comprises a cylindrical housing, in particular a circular-cylindrical housing, in which the fluid inlet is located on one base surface, and the fluid outlet on the opposite base surface, of the cylinder. For simple and fast mounting of the pneumatic adjustment arrangement, the latter advantageously has, at the sound absorber housing or at the part of the sound absorber housing which constitutes the fluid inlet and the fluid outlet, a plug-in coupling section for fitting on a corresponding section of a fluid line. In this way, fluid lines, which are embodied, for example, as plastic lines or rubber lines, are easily fitted onto the respective plug-in coupling sections, and also remain present in a stable fashion there owing to their frictional resistance with respect to the plug-in coupling.

However, it is also conceivable to provide other possibilities for connecting to corresponding fluid lines such as, for example, providing a flange for producing a flanged connection etc.

It is also conceivable, according to a further refinement of the invention, to use a plurality of sound absorbers which are connected in series and/or in parallel with respect to one another. In this context, in particular a plurality of sound absorbers can be provided between the valve device and a respective chamber or bubble which can be filled with air, wherein the sound absorbers are arranged in series or in parallel with respect to one another. In this way, the reduction of the noise can be lowered further. In particular, it is possible here to use a plurality of sound absorbers which are optimized for various frequencies, wherein one sound absorber is optimized for medium frequencies, and a further sound absorber is optimized for high frequencies of a sound or noise to be absorbed.

According to a further aspect of the invention, a vehicle seat having a pneumatic adjustment arrangement or a refinement thereof as illustrated above is provided. In this context, the vehicle seat can have a seat bearing surface, wherein at least one chamber, which can be filled with air, for changing the contour of the vehicle seat or the seat bearing surface is provided in the seat bearing surface. In conjunction with the invention, the term "seat bearing surface" is to be understood as meaning the surface of the seat facing the user of the seat, on the seat cushion or the seat surface and/or on the backrest. In this way, a vehicle seat can be provided which has a multiplicity of comfort functions by providing the pneumatic adjustment arrangement, which vehicle seat operates, however, at the same time with minimized noise during the implementation of the comfort functions. For example, by virtue of the change in volume of the at least one chamber resulting from the selective and regular filling with air and subsequent emptying of the compressed air, it is possible to use the one or more chambers which can be filled with air for massage purposes or within the scope of a dynamic seat.

According to a further aspect, a sound absorber is provided for a pneumatic adjustment arrangement according to the above illustration, wherein the sound absorber has a housing with a fluid inlet for letting pressure medium or air into an interior space of the housing, and a fluid outlet for discharging pressure medium or air out of the interior space. In addition, the sound absorber has a sound-absorbing material which is arranged in the interior space of the housing and possibly attached there.

Advantageous refinements of the pneumatic adjustment arrangement are, insofar as they can be transferred to the vehicle seat or the sound absorber, also to be considered to be advantageous refinements of the vehicle seat and of the sound absorber, and vice versa.

BRIEF DESCRIPTION OF THE DRAWINGS

Exemplary embodiments of the present invention will now be explained in more detail below with reference to the appended drawings, in which.

DETAILED DESCRIPTION OF THE INVENTION

Figure 1:
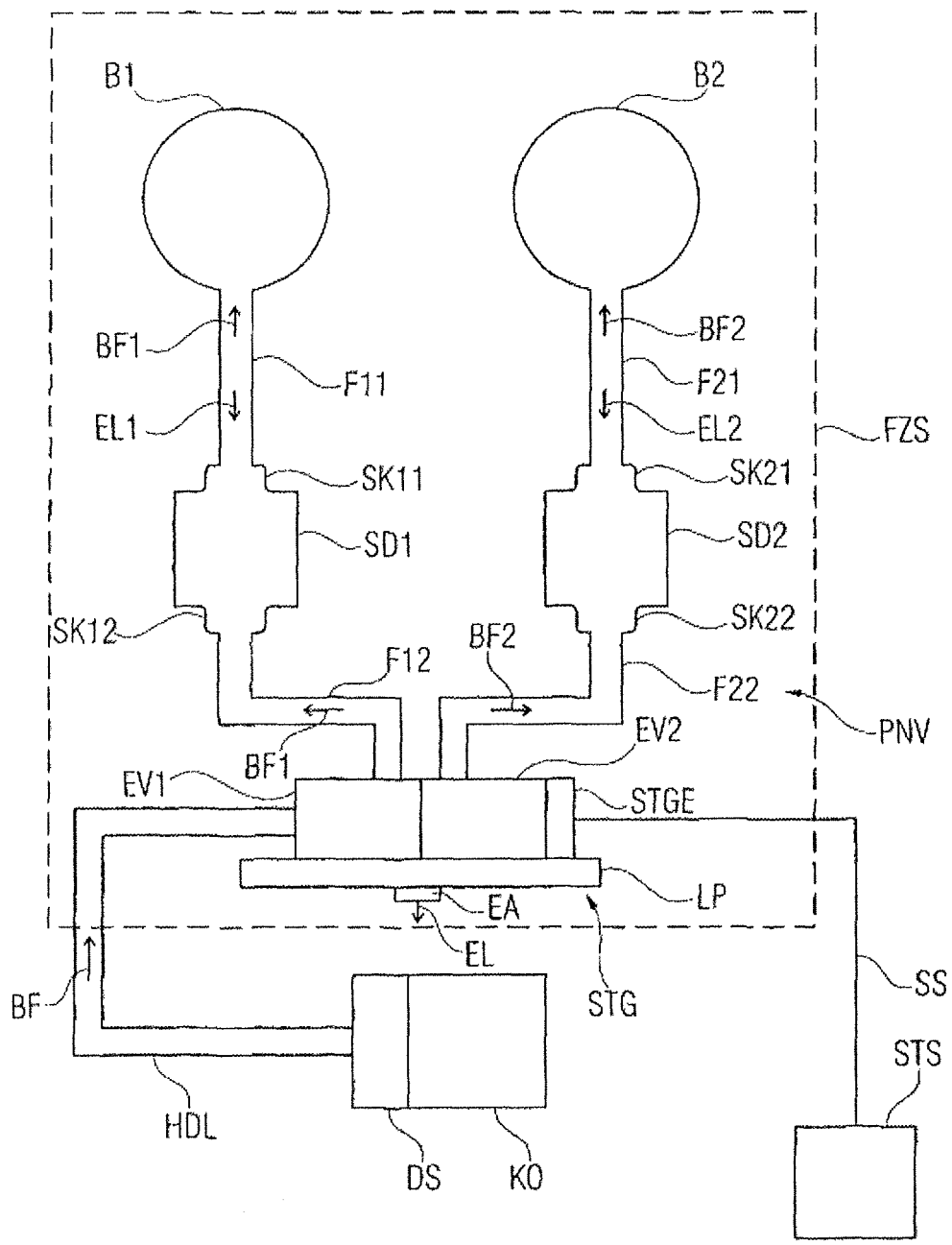
FIG. 1 shows a pneumatic adjustment arrangement for a vehicle seat according to an embodiment of the invention.

Reference will firstly be made to FIG. 1 which shows a schematic illustration of a vehicle seat FZS with a pneumatic adjustment arrangement PNV according to one embodiment of the invention. The vehicle seat FZS can have here a seat surface or a seat cushion and a backrest with which a user of the seat, such as, for example, the driver of a vehicle, comes into contact or against which he bears when he is located on the seat. In summary, the two surfaces against which a user of the seat bears can be referred to here as "seat bearing surfaces".

In order to implement comfort functions in the vehicle seat FZS, according to the embodiment in FIG. 1, two chambers or bubbles B1 and B2 which can be filled with a pressure medium, in particular compressed air, are provided. Although only two bubbles are provided according to the embodiment illustrated in FIG. 1, it is also conceivable to provide only one or more than two bubbles, for example in order to implement comfort functions in the vehicle seat FZS. In particular, bubbles of this type can be arranged as actuating elements under a seat bearing surface, whether on the seat surface or on the seat cushion itself and/or on the backrest. As a result of the possibility of filling the bubbles with air, the volume thereof can be changed, with the result that the respective seat bearing surface or the contour thereof can also be changed by virtue of the change in volume of a corresponding bubble. In particular, for a user of the seat, who is located on the seat, it is possible to generate a corresponding pressure surface by filling a corresponding bubble. In this way, for example a massage function can be implemented by alternately filling and emptying a corresponding bubble, but it is also possible to implement a dynamic seat in which one or more bubbles are filled with pressure medium in order to stabilize the user on the vehicle seat, irrespective of a steering angle of a vehicle.

The pressure medium, in particular in the form of compressed air, which is necessary to fill the bubbles B1 and B2, is made available by a pressure source which is implemented, in particular, in the form of a compressor KO. According to the embodiment in FIG. 1, this compressor supplies a pressure accumulator DS with compressed air, and is configured to keep the pressure in the pressure accumulator DS above a predetermined pressure value by means of a corresponding pressure regulating process. However, it is also conceivable to implement a pneumatic adjustment arrangement PNV without a corresponding pressure accumulator DS.

The compressed air which is made available by the compressor KO or the pressure accumulator DS is made available to a seat control unit STG via a main pressure line HDL. This seat control unit STG can have here a printed circuit board LP on which, on the one hand, electropneumatic valves EV1 and EV2 and, on the other hand, control unit electronics STGE for electrically actuating the valves EV1 and EV2 are provided. The valves EV1 and EV2 can be magnetically activated valves or valves which are controlled by means of a piezo-actuator or piezo-wafer here, wherein by applying a corresponding control signal at the control unit electronics STGE it is possible to actuate a corresponding valve for a pressure medium flow in accordance with the arrows BF, BF1, BF2 in order to fill a corresponding bubble B1 or B2.

Accordingly, a respective valve EV1 and EV2 can be placed, by means of a respective venting signal at the control unit electronics STGE, in a position in which pressure medium or compressed air can be discharged from a bubble B1 in accordance with the arrow EL1 or the bubble B2 in accordance with the arrow EL2 through a venting outlet EA (summarized by means of an arrow EL) from a respective compressed air branch.

A characterizing feature of the pneumatic adjustment arrangement according to FIG. 1 is the provision of a respective sound absorber SD1 and SD2 between a respective valve (EV1 or EV2) and a corresponding bubble (B1 or B2). In this context, according to the illustration in FIG. 1, a first fluid line or compressed air line F11 is provided between the bubble B1 and the first sound absorber SD1, and a second fluid line or compressed air line F12 is provided between the sound absorber SD1 and the corresponding electropneumatic valve EV1. In an analogous fashion to this, a third fluid line or compressed air line F21 is provided between the second bubble B2 and the second sound absorber SD2, and a fourth fluid line or compressed air line F22 is provided between the second sound absorber SD2 and the second electropneumatic valve EV2 which corresponds to the second bubble. The specified compressed air lines F11, F12, F21 and F22 can be plastic lines or rubber hose lines which are fitted onto corresponding plug-in couplings SK11 and SK12 of the sound absorber SD1 or onto plug-in couplings SK21 and SK22 of the second sound absorber SD2.

The filling or emptying of the bubbles B1 and B2 takes place, as already mentioned above, by correspondingly switching the valves EV1 and EV2, which are actuated by the control unit electronics STGE. In this context, corresponding actuation programs (for example massage programs) can be stored in the control unit electronics STGE, which actuation programs are correspondingly called and carried out in response to an external signal SS, which is output, for example, by a seat control unit STS. It is also conceivable for corresponding programs to be stored in the seat control unit STS and transmitted to the control unit electronics STGE when necessary.

By providing the sound absorbers SD1 and SD2, it is now possible to absorb flow noise which occurs when the pressure medium or the compressed air flows through the various pneumatic components. Noise which occurs, for example, in the valves (in particular if a piezo-actuator or a piezo-wafer is provided for the actuation), can also be minimized by the corresponding sound absorbers.

Figure 2:
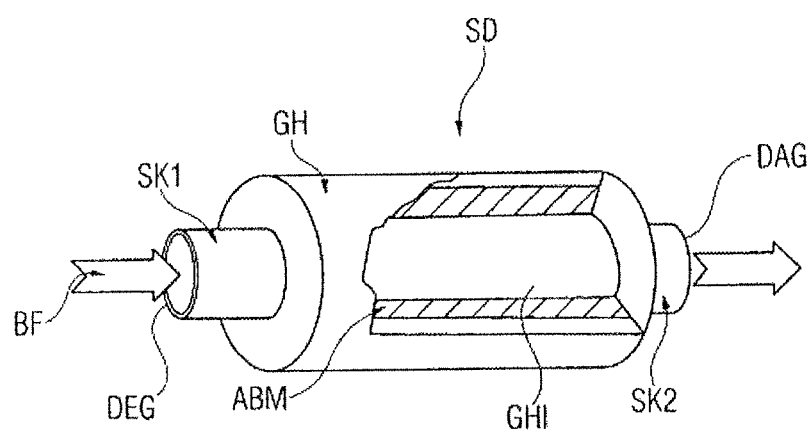
FIG. 2 shows a schematic illustration of a sound absorber, in particular for use in a pneumatic adjustment arrangement for a vehicle seat according to FIG. 1.

Reference will now be made to FIG. 2 in which a detailed schematic illustration of a sound absorber SD, in particular for use for the pneumatic adjustment arrangement PNV illustrated in FIG. 1, is shown. The sound absorber SD is composed here of an essentially circular-cylindrical housing GH which has, on its base surfaces, respective plug-in couplings SK1 and SK2 for fitting on, in particular, elastic plastic lines or rubber hose lines. According to the illustration in FIG. 2, the air inlet or fluid inlet DEG is located at the plug-in coupling SK1 and the air outlet or fluid outlet DAG is located at the plug-in coupling SK2. According to the illustration in FIG. 2, pressure medium or compressed air flows along the arrow BF from left to right in the image plane here, in order to fill at least one bubble (B1 and B2) with compressed air.

In this context, the compressed air flows through an interior space GHI of the housing GH in which, in addition, a sound-absorbing material ABM is located. This sound-absorbing material is arranged, as it were, in a shell shape on an inner wall of the lateral surface of the housing and can also be attached to the inner wall. It is to be emphasized that the sound absorber SD is constructed in such a way that a free flow cross section is formed in the interior space GHI for the compressed air, which flow cross section extends from the air inlet DEG to the air outlet DAG. In this way, effective sound absorption can be carried out without influencing the mass flow of the compressed air. The dimensions of the sound-absorbing material can be configured individually. This means that the cross-sectional surface and the length of the absorption material can vary. Likewise, the housing is to be matched to the geometric dimensions of the sound-absorbing material ABM and to the desired flow cross section. The sound-absorbing material can be composed, for example, of a foamed material, with the result that a sound absorber for reducing noise in the medium and high frequencies can be produced.

Although it is shown in FIG. 1 that in each case just one sound absorber is provided in a respective compressed air branch between a valve and a bubble, it is also conceivable to provide a plurality of sound absorbers in each case. Said sound absorbers can be connected, for example, in series or in parallel with respect to one another. It is possible in this context to provide various sound absorbers in one compressed air branch, which sound absorbers have different sound-absorbing properties. For example, in each case a first sound absorber for reducing noise with medium frequencies and a second sound absorber for reducing noise with high frequencies can be provided.

The invention claimed is:

1. A pneumatic adjustment arrangement for a vehicle seat, comprising:
    at least one chamber, which can be filled with a pressure medium, as an adjustment element;
    a fluid line extending from the at least one chamber to a pressure medium source for filling and/or emptying the at least one chamber;
    a valve device which is provided in the fluid line inline between the pressure source and the at least one chamber and configured for volume flow regulation of the pressure medium from the pressure source to the at least one chamber; and
    a sound absorber which is also arranged in the fluid line in order to absorb sound occurring in the fluid line;
    wherein the sound absorber is arranged in the fluid line, between the valve device and the at least one chamber.

2. The pneumatic adjustment arrangement as claimed in claim 1, in which the sound absorber) comprises:
    a housing with a fluid inlet for letting in pressure media, and a fluid outlet for discharging the pressure medium;
    a sound-absorbing material which is arranged in an interior space (GHI) of the housing.

3. The pneumatic adjustment arrangement as claimed in claim 2, wherein the sound absorber has a free flow cross section for the pressure medium in the interior space, from the fluid inlet in the direction of the fluid outlet.

4. The pneumatic adjustment arrangement as claimed in claim 3, wherein, in the housing of the sound absorber, the sound-absorbing material is arranged bearing against an inner wall of the housing.

5. The pneumatic adjustment arrangement as claimed in claim 3, wherein the sound absorber has a cylindrical housing.

6. The pneumatic adjustment arrangement as claimed in claim 3, wherein the sound absorber has, both at the fluid inlet and at the fluid outlet, a coupling section for fitting on a section of a fluid line.

7. The pneumatic adjustment arrangement as claimed in claim 2, wherein, in the housing of the sound absorber, the sound-absorbing material is arranged bearing against an inner wall of the housing.

8. The pneumatic adjustment arrangement as claimed in claim 7, wherein the sound absorber has a cylindrical housing.

9. The pneumatic adjustment arrangement as claimed in claim 7, wherein the sound absorber has, both at the fluid inlet and at the fluid outlet, a coupling section for fitting on a section of a fluid line.

10. The pneumatic adjustment arrangement as claimed in claim 2, wherein the sound absorber has a cylindrical housing.

11. The pneumatic adjustment arrangement as claimed in claim 10, wherein the sound absorber has, both at the fluid inlet and at the fluid outlet, a coupling section for fitting on a section of a fluid line.

12. The pneumatic adjustment arrangement as claimed in claim 2, wherein the sound absorber has, both at the fluid inlet and at the fluid outlet, a coupling section for fitting on a section of a fluid line.

13. The pneumatic adjustment arrangement as claimed in claim 1, comprising a multiplicity of sound absorbers which are connected in series and/or in parallel with respect to one another.

14. A vehicle seat having a pneumatic adjustment arrangement as claimed in claim 1, wherein the vehicle seat has a seat bearing surface, wherein the at least one chamber is arranged underneath the seat bearing surface in order to influence the contour thereof.

15. A pneumatic adjustment arrangement for a vehicle seat, comprising:
- at least one chamber, which can be filled with a pressure medium, as an adjustment element;
- a fluid line for filling and/or emptying the at least one chamber;
- a valve device which is provided in the fluid line for volume flow regulation; and
- a sound absorber which is also arranged in the fluid line in order to absorb sound occurring in the fluid line;
- wherein the sound absorber is arranged in the fluid line, between the valve device and the at least one chamber, and
- wherein the valve device is provided in the fluid line inline between the sound absorber and a pressure medium source.

* * * * *